United States Patent
Lepird et al.

(10) Patent No.: US 11,977,440 B2
(45) Date of Patent: May 7, 2024

(54) ON-BOARD FEEDBACK SYSTEM FOR AUTONOMOUS VEHICLES

(71) Applicant: FORD GLOBAL TECHNOLOGIES, LLC, Dearborn, MI (US)

(72) Inventors: John Lepird, Pittsburgh, PA (US); Lorenzo Nardi, Bavaria (DE); Andrew T. Hartnett, West Hartford, CT (US)

(73) Assignee: Ford Global Technologies, LLC, Dearborn, MI (US)

( * ) Notice: Subject to any disclaimer, the term of this patent is extended or adjusted under 35 U.S.C. 154(b) by 773 days.

(21) Appl. No.: 17/102,303

(22) Filed: Nov. 23, 2020

(65) Prior Publication Data
US 2022/0164245 A1     May 26, 2022

(51) Int. Cl.
*G06F 11/00*     (2006.01)
*G06F 11/07*     (2006.01)
*G06F 11/14*     (2006.01)

(52) U.S. Cl.
CPC ........ *G06F 11/079* (2013.01); *G06F 11/0709* (2013.01); *G06F 11/0775* (2013.01); *G06F 11/14* (2013.01)

(58) Field of Classification Search
CPC ............... G06F 11/079; G06F 11/0709; G06F 11/0775; G06F 11/14
See application file for complete search history.

(56) References Cited

U.S. PATENT DOCUMENTS

| 7,225,368 B2 | 5/2007 | Lancaster |
| 10,210,411 B2 | 2/2019 | Mittal et al. |
| 10,410,115 B2 | 9/2019 | Lewis et al. |

(Continued)

FOREIGN PATENT DOCUMENTS

| WO | 2020171916 A1 | 8/2020 | |
| WO | WO-2020171916 A1 * | 8/2020 | ............. G01S 13/58 |

OTHER PUBLICATIONS

Wenyuan, Z. et al., Dsdnet: Deep structured self-driving network, In European conference on computer vision, pp. 156-172. Springer, Cham, 2020, Aug. 23, 2020, available at http://www.ecva.net/papers/eccv_2020/papers_ECCV/papers/123660154.pdf.

(Continued)

*Primary Examiner* — Erika A Washington
(74) *Attorney, Agent, or Firm* — Frank A. MacKenzie; Brooks Kushman P.C.

(57) ABSTRACT

A system includes an on-board electronic device of an autonomous vehicle, and a computer-readable medium having one or more programming instructions. The system receives one or more forecast messages pertaining to a track, where each of the forecast messages includes a unique identifier associated with the track, and receives one or more inference messages pertaining to the track, where each of the inference messages includes the unique identifier. The system aggregates the one or more forecast messages and the one or more inference messages to generate a message set, and applies a set of processing operations to the message set to generate a feedback message. The system identifies one or more events from the feedback message, automatically generates an annotation for one or more of the events that is identified, and embeds the generated annotations in an event log for the autonomous vehicle.

16 Claims, 6 Drawing Sheets

(56) References Cited

U.S. PATENT DOCUMENTS

| | | |
|---|---|---|
| 10,510,016 B2 | 12/2019 | Garcia Sedano et al. |
| 2019/0025841 A1 | 1/2019 | Haynes et al. |
| 2019/0132709 A1* | 5/2019 | Graefe ............. G08G 1/096716 |
| 2020/0130685 A1 | 4/2020 | Nguyen et al. |
| 2020/0151599 A1 | 5/2020 | Pey et al. |
| 2020/0202706 A1* | 6/2020 | Chaves ................ G05D 1/0289 |
| 2022/0121201 A1* | 4/2022 | Williams ............. G05D 1/0212 |

OTHER PUBLICATIONS

International Search Report of PCT/US2021/057637 dated Feb. 1, 2022, 4 pages.

Written Opinion of PCT/US2021/057637 dated Feb. 2, 2022, 5 pages.

International Preliminary Report on Patentability of PCT/US2021/057637 dated Feb. 2, 2022, 6 pages.

* cited by examiner

ON-BOARD FEEDBACK SYSTEM FOR AUTONOMOUS VEHICLES

BACKGROUND

In order for an autonomous vehicle to plan its actions, it must first make predictions about the future state of the world. In practice, these predictions may be flawed. These flaws may range from minor discrepancies to misunderstanding of relevant behavior. However, these flaws also contain useful information that can be used to improve the operation of an AV's prediction system. Existing solutions do not systematically capture, store and analyze these flaws in order to facilitate continual learning of the AV.

This document describes methods and systems that are directed to addressing the problems described above, and/or other issues.

SUMMARY

In various embodiments, a system includes an on-board electronic device of an autonomous vehicle, and a computer-readable medium having one or more programming instructions. The system receives one or more forecast messages pertaining to a track, where each of the forecast messages includes a unique identifier associated with the track, and receives one or more inference messages pertaining to the track, where each of the inference messages includes the unique identifier. The system aggregates the one or more forecast messages and the one or more inference messages to generate a message set, and applies a set of processing operations to the message set to generate a feedback message. The feedback message includes an indication of one or more forecast errors between one or more of the forecast messages and one or more of the inference messages. The system identifies one or more events from the feedback message, automatically generates an annotation for one or more of the events that is identified, and embeds the generated annotations in an event log for the autonomous vehicle.

The system may receive one or more forecast messages pertaining to a track comprise one or more programming instructions by monitoring a forecast channel that is broadcasting the one or more forecast messages.

The system may receive one or more inference messages pertaining to a track by monitoring an inference channel that is broadcasting the one or more inference messages.

The one or more forecast messages may include one or more forecasts of a future state of the autonomous vehicle or one or more forecasts of a future state of one or more objects or actors in proximity to the autonomous vehicle.

The one or more inference messages may include information pertaining to a current state of the autonomous vehicle or a current state of one or more objects or actors in proximity to the autonomous vehicle.

The system may apply a set of processing operations that are specific to the unique identifier to the message set to generate a feedback message by accessing a mapping from a data store, and identifying the set of processing operations that are associated with the unique identifier from the mapping.

The system may identify one or more events from the feedback message by applying a second set of processing operations to the feedback message, where the second set of processing operations is associated with a particular event type.

The system may automatically generate an annotation for the event by automatically generating a human-readable string comprising or more alphanumeric characters.

The system may train one or more classifiers of one or more machine learning models for the autonomous vehicle using the annotations in the event log.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
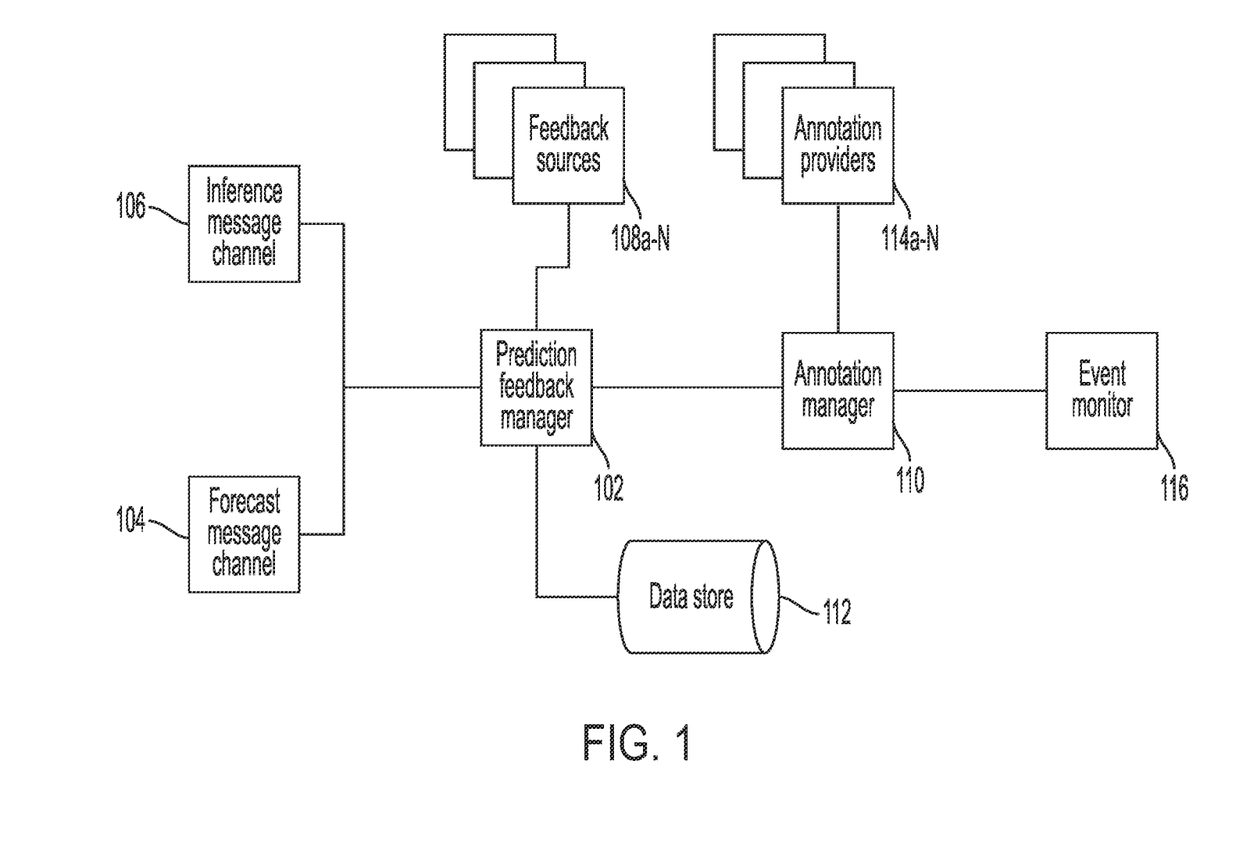
FIG. 1 illustrates an example feedback assessment system.
Figure 2:
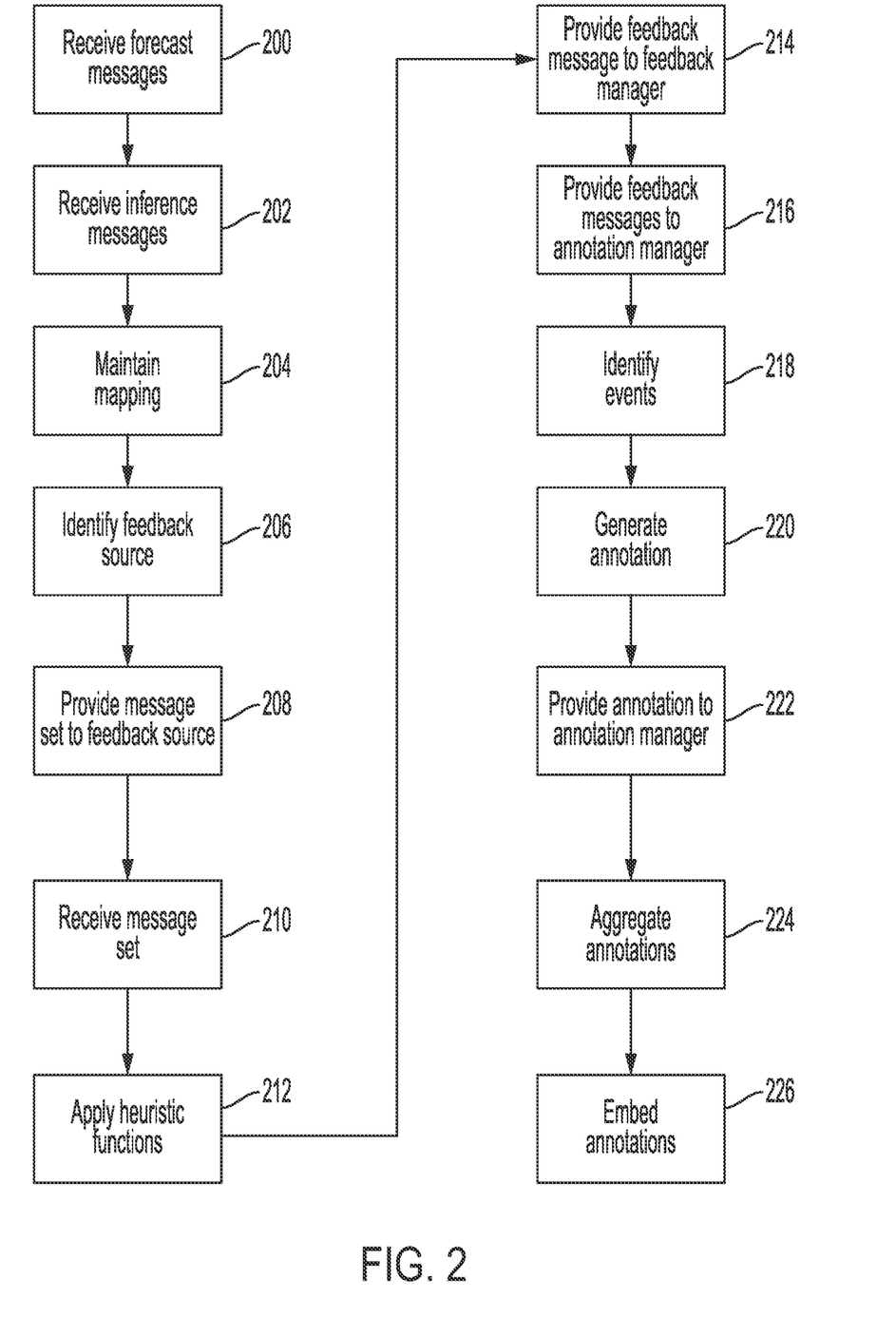
FIG. 2 illustrates a flow chart of an example method of providing and evaluating feedback.

FIG. 1 illustrates an example feedback assessment system. FIG. 2 illustrates a flow chart of an example method of providing and evaluating feedback according to various embodiments.

In various embodiments, the feedback assessment system described in this disclosure may be implemented using one or more on-board computing devices of an autonomous vehicle. As illustrated by FIG. 1, the system may include a prediction feedback manager 102. A prediction feedback manager may be implemented as hardware, software, firmware, or a combination of hardware, software and/or firmware. A prediction feedback manager 102 may receive and route inference messages and/or forecast messages to one or more feedback sources, as described in more detail below.

As illustrated in FIG. 1, a prediction feedback manager may subscribe to a forecast message channel 104 and may receive 200 one or more forecast messages from the channel. A forecast message channel may broadcast one or more forecast messages. A forecast message refers to a message that includes one or more forecasts or predictions pertaining to an autonomous vehicle or its environment. The forecasts or predictions may be about the future state of an autonomous vehicle, or a future state about one or more objects or actors in proximity to the autonomous vehicle. For instance, a forecast message may include an indication that a certain object in proximity to an autonomous vehicle is a parked vehicle, and that the vehicle will remain parked as the autonomous vehicle navigates past the object. One or more objects or actors may be in proximity to an autonomous vehicle if they are within frame of the autonomous vehicle, or if they are expected to enter a frame of an autonomous vehicle.

A forecast message may include an indication of a particular track to which the forecasts or predictions of the message pertain. The indication may be a unique identifier associated with the track. A track refers to a spatial description that identifies an object by its kinematics and/or classification attributes. A track may include, without limitation, a location (e.g., an x-coordinate and a y-coordinate), a range-rate, and a velocity (e.g., speed plus a direction of travel) for each data point of a point cloud that is associated with the object. Techniques for generating tracks may include, without limitation, using a Kalman filter.

In various embodiments, one or more forecast messages may be generated by a prediction subsystem of an autonomous vehicle. The one or more forecast messages may be broadcast via the forecast message channel. One or more systems, subsystems, tasks, or other devices or components may subscribe to the forecast message channel and may receive a forecast message once broadcast.

As illustrated in FIG. 1, a prediction feedback manager may subscribe to an inference message channel 106 and may receive 202 one or more inference messages from the channel. An inference message channel may broadcast one or more inference messages. An inference message refers to a message that includes information about the current state of an autonomous vehicle or a current state of one or more objects or actors in an environment of the autonomous vehicle. One or more objects or actors may be in proximity to an autonomous vehicle if they are within frame of the autonomous vehicle, or if they are expected to enter a frame of an autonomous vehicle. For instance, referring to the above example, when the autonomous vehicle is closer in proximity to the object previously forecasted to be a parked vehicle, the system may generate an inference message that includes information pertaining to the current state of the object such as, for example, its speed, location, and/or the like.

An inference message may include an indication of a particular track to which the information included in the message pertain. The indication may be a unique identifier associated with the track.

In various embodiments, one or more inference messages may be generated by a perception subsystem of an autonomous vehicle. The one or more inference messages may be broadcast via the inference message channel 106. One or more systems, subsystems, tasks, or other devices or components may subscribe to the inference message channel and may receive an inference message once broadcast.

As illustrated in FIG. 1, a feedback manager 102 may be in communication with one or more feedback sources 108a-N. A feedback source may be one or more tasks that are configured to run one or more processing operations on one or more forecast messages and/or inference messages to generate feedback. The processing operations may include, without limitation, one or more rules, constraints, heuristics, other logic, and/or the like. An example of a processing operation may include, for example, performing a comparison of data, determining whether a value falls below or above a threshold value, determining whether a value is within a certain range or outside of a certain range, and/or the like.

The feedback manager 102 may maintain 204 a mapping of tracks and feedback sources. For instance, a particular feedback source may be associated with only certain tracks. To facilitate the proper routing of inference messages and/or forecast messages, the feedback manager may utilize a mapping. The mapping may be stored in one or more data stores that are accessible to the forecast manager. For instance, a mapping may store an indication of a feedback source (e.g., a name of the feedback source, a unique identifier associated with the feedback source, and/or the like) such that it corresponds to the unique track identifier(s) of the track(s) to which it is associated. A forecast manager may access a mapping from a data store in order to determine to which feedback source it will route one or more inference messages and/or one or more forecast messages.

A feedback manager may collect one or more forecast messages and/or inference messages, and may organize those pertaining to the same unique track identifier to generate 204 a message set. The feedback manager may utilize the mapping to identify 206 the feedback source associated with the unique track identifier associated with a message set.

In various embodiments, if a feedback manager receives a forecast message and/or an inference message associated with a unique track identifier that is not included in the mapping, the feedback manager may assign a feedback source to the new track identifier and may update the mapping to include an indication of the new track identifier and the assigned feedback source.

In various embodiments, if a feedback manager does not receive any new forecast messages and/or inference messages for a certain unique track identifier in the mapping after a certain period of time, the feedback manager may remove the indication of the unique track identifier and associated feedback source(s) from the mapping. The feedback manager may remove the associated feedback sources. For example, a feedback manager may periodically check to see when an inference message and/or forecast message was last received for a particular unique track identifier in the mapping. If the most recent inference message and/or forecast message for the unique track identifier was received more than three hours ago, the feedback manager may remove the unique track identifier and feedback source association from the mapping, and may remove the associated feedback sources from memory. It is understood that additional and/or alternate time periods may be used within the scope of this disclosure.

The feedback manager may provide 208 the message set to the identified feedback source. In various embodiments, the feedback manager may make a copy of the message set and provide 208 the copy to the feedback source.

The feedback source may receive 210 the message set. In various embodiments, the feedback source may store at least a portion of the received message set in a buffer. The buffer may be a fixed length circular buffer. As such, when the size of the buffer is exceeded, old message sets may be overwritten.

The feedback source may apply 212 one or more of its processing operations to the message set to generate feedback. The one or more processing operations may analyze one or more of the forecast messages in the message set to identify one or more predictions or forecasts present in the message(s). The processing operations may compare the identified predictions or forecasts to state information included in one or more of the inference messages to assess the accuracy of the predictions or forecasts. The feedback source may generate 212 a feedback message that includes information pertaining to the comparison. This information may include one or more forecast errors. A forecast error refers to a difference or discrepancy between a forecast or prediction and an inference or actual observation associated with the forecast or prediction. For example, if the prediction or forecast was not accurate, the feedback source may generate 212 a feedback message that includes an indication of the difference between the forecast or prediction and the actual observation as a forecast error. As another example, if the prediction or forecast was accurate, the feedback source may generate 212 a feedback message that includes an indication that the prediction or forecast was accurate.

In various embodiments, information pertaining to the comparison may include updated information about a prediction or a forecast. For example, the system may determine with high confidence that an object was parked at t=0. At t=0.1, the system may observe the object moving at 10 m/s. This information may be used to conclude that the initial parked determination was likely incorrect.

As another example, one or more forecast messages may indicate that the system made a prediction at time T that an object will be at position X at time T+3 seconds. At time T+3 seconds, the system may generate an inference message that includes an observation of the object's position at Y. A feedback source may analyze the forecast message and inference message, and may generate a feedback message that includes an indication of the difference between X and Y. It is understood that other types of analysis may be performed and other types of feedback may be generated within the scope of this disclosure.

The feedback source may provide 214 the feedback message to the feedback manager. In various embodiments, the feedback manager may store one or more of the feedback messages to one or more data stores 112, as illustrated in FIG. 1. At least a portion of the stored feedback messages may be used to track progress and identify regressions. In some embodiments, at least a portion of the stored feedback messages may be used as a real-time indication of the system's understanding of the environment.

The feedback manager may provide 216 one or more feedback messages to an annotation manager 110. As illustrated in FIG. 1, an annotation manager may provide at least a portion of one or more feedback messages to one or more annotation providers 114*a*-N. An annotation provider may be one or more tasks that are configured to run one or more processing operations on one or more feedback messages to generate one or more annotations.

In various embodiments, one or more annotation providers may be associated with a unique track identifier. Like the feedback manager described above, an annotation manager may maintain a mapping of unique track identifiers and annotation providers. When an annotation manager receives a feedback message, it may identify from the feedback message the corresponding unique track identifier. The annotation manager may identify from the mapping the annotation provider associated with a unique track identifier and may provide that annotation provider with at least a portion of the feedback message.

In various embodiments, if an annotation manager receives a feedback message associated with a unique track identifier that is not included in the mapping, the annotation manager may assign an annotation provider to the new track identifier and may update the mapping to include an indication of the new track identifier and the assigned annotation provider. In various embodiments, the system may enable and/or disable one or more annotation providers based on the type of analysis that is being performed. For instance, an annotation provider associated with performing reviews of parked vehicles may be enabled when data related to parked vehicles is being collected.

In various embodiments, one or more annotation providers may be associated with a particular object type. An annotation manager may maintain a mapping of object types and annotation providers. When an annotation manager receives a feedback message, it may identify from the feedback message the corresponding object type. The annotation manager may identify from the mapping the annotation provider associated with the object type and may provide that annotation provider with at least a portion of the feedback message.

In various embodiments, if an annotation manager receives a feedback message associated with an object type that is not included in the mapping, the annotation manager may assign an annotation provider to the new object type and may update the mapping to include an indication of the new object type and the assigned annotation provider.

An annotation provider may apply one or more processing operations on the content of one or more feedback messages to identify 218 one or more events. An event may be an occurrence that the system identifies as being desirable to be available for off-board analysis. When an event fires, corresponding event data may be stored in such a way that prevents it from being overwritten by the system. As such, this event data may be stored for subsequent off-board analysis. This analysis may involve human review and/or automated tasks.

In various embodiments, one or more of the annotation providers may be associated with one or more processing operations that can be used to identify a particular event or event type. In this way, each annotation provider may analyze the content of one or more feedback messages to determine whether the content is indicative of a particular event or event type. For example, an annotation provider may be associated with one or more processing operations related to the parked status of objects. These processing operations may be applied to the content of one or more feedback messages to determine whether an object that was forecast as being parked was not actually parked or whether an object that was forecast as not being parked was actually parked. If either of these situations is true, the annotation provider may identify 218 it as an event of a parking event type.

As another example, an annotation provider may be associated with one or more processing operations related to the position of an observed object and/or actor. For instance, referring to the above example, an annotation provider may identify 218 an event if the difference between the predicted position of an object (X) and the actual position of the object (Y) exceeds a threshold value. Similar processing operations related to yaw, speed, and acceleration forecast error may be used within the scope of this disclosure.

In various embodiments, other examples of events that may be identified 218 may include, without limitation, large forecast displacement errors, unrecognized behavior of an object or actor, situations where an actor is designated as parked but is observed moving, situations where the system changes a binary designation of an object within a time period (e.g., quickly changing the binary classification of whether an actor is parked or not), situations where an actor performs a K-point turn or a lane change, and/or other situations where data is collected for a representative dataset.

The annotation provider may automatically generate 220 an annotation for one or more identified events. The annotation may be a human-readable string. For example, the annotation may be a string of alphanumeric characters. In various embodiments, the human-readable annotation may describe the event being annotated. For example, for situations where there is an error between a prediction and an actual trajectory of an actor, an annotation provide may generate an annotation that includes an indication of how large (in meters for example) the error was. Using annotations that include one or more human-readable strings may facilitate performing large-scale offline queries to identify events of interest.

The annotation that may be generated may include the unique identifier of the track having the object or actor of interest. For example, if an object associated with Track 1234 is initially determined to be parked, but later is determined to be moving, an annotation provider may generate the annotation #is_parked_error #parked_but_moving #track_1234. Additional and/or alternate annotations may be used within the scope of this disclosure.

The annotation provider may provide 222 the generated annotation(s) to the annotation manager. The annotation manager may aggregate 224 the annotations received from one or more annotation providers that are related to a unique track identifier.

In various embodiments, the annotation manager may provide at least a portion of the aggregated annotations to an event manager 116. The event monitor may embed 226 one or more of the annotations to one or more autonomous vehicle event logs associated with the relevant unique track identifier such that it is associated with the applicable event. An annotation may be stored along with its associated timestamp as a pair (e.g., (timestamp, string)). A time period associated with the event may be considered to be a certain time period before the annotation occurs and a certain time period after the annotation occurs. The systems and/or processes described in this disclosure may limit manual and/or automated post-processing to only objects of interest, which can speed up applicable tasks by 50-100 times.

At least a portion of the annotated event logs may be used to train one or more classifiers of one or more machine learning models, for example, one or more prediction models, for an autonomous vehicle. For example, annotations indicating errors in forecasts relating to the parked status of objects (e.g., identifying vehicles as parked when they are really moving) may be used to train a classifier of a model such that in the future, an autonomous vehicle may identify similar objects as moving rather than being parked.

As another example, annotations indicating that an actor changed lanes when it was not expected to may be used to train a classifier of a model such that in the future, an autonomous vehicle may identify actors portraying similar behavior as likely to change lanes.

Figure 3:
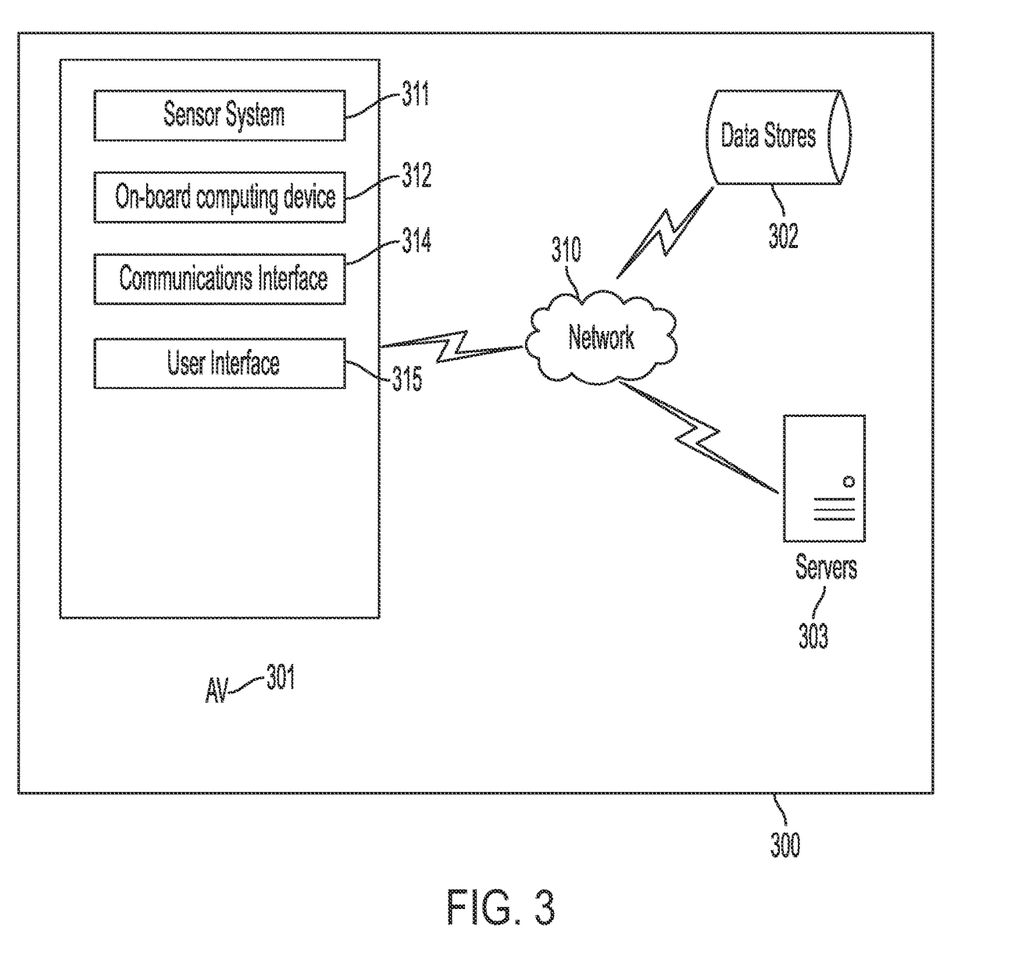
FIG. 3 is a block diagram illustrating an example autonomous vehicle system.

FIG. 3 is a block diagram illustrating an example system 300 that includes an autonomous vehicle 301 in communication with one or more data stores 302 and/or one or more servers 303 via a network 310. Although there is one autonomous vehicle shown, multiple autonomous vehicles may be coupled to each other and/or coupled to data stores 302 and/or servers 303 over network 310. Network 310 may be any type of network such as a local area network (LAN), a wide area network (WAN) such as the Internet, a cellular network, a satellite network, or a combination thereof, and may be wired or wireless. Data store(s) 302 may be any kind of data stores such as, without limitation, map data store(s), traffic information data store(s), user information data store(s), point of interest data store(s), or any other type of content data store(s). Server(s) 303 may be any kind of servers or a cluster of servers, such as, without limitation, Web or cloud servers, application servers, backend servers, or a combination thereof.

As illustrated in FIG. 3, the autonomous vehicle 301 may include a sensor system 311, an on-board computing device 312, a communications interface 314, and a user interface 315. Autonomous vehicle 301 may further include certain components (as illustrated, for example, in FIG. 4) included in vehicles, such as, an engine, wheels, steering wheel, transmission, etc., which may be controlled by the on-board computing device 312 using a variety of communication signals and/or commands, such as, for example, acceleration signals or commands, deceleration signals or commands, steering signals or commands, braking signals or commands, etc.

The sensor system 311 may include one or more sensors that are coupled to and/or are included within the autonomous vehicle 301. Examples of such sensors include, without limitation, a LiDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 301, information about the environment itself, information about the motion of the autonomous vehicle 301, information about a route of the autonomous vehicle, or the like. As autonomous vehicle 301 travels over a surface, at least some of the sensors may collect data pertaining to the surface.

The LiDAR system may include a sensor configured to sense or detect objects and/or actors in an environment in which the autonomous vehicle 301 is located. Generally, LiDAR system is a device that incorporates optical remote sensing technology that can measure distance to a target and/or other properties of a target (e.g., a ground surface) by illuminating the target with light. As an example, the LiDAR system may include a laser source and/or laser scanner configured to emit laser pulses and a detector configured to receive reflections of the laser pulses. For example, the LiDAR system may include a laser range finder reflected by a rotating mirror, and the laser is scanned around a scene being digitized, in one, two, or more dimensions, gathering distance measurements at specified angle intervals. The LiDAR system, for example, may be configured to emit laser pulses as a beam. Optionally, the beam may be scanned to generate two dimensional or three dimensional range matrices. In an example, the range matrices may be used to determine distance to a given vehicle or surface by measuring time delay between transmission of a pulse and detection of a respective reflected signal. In some examples, more than one LiDAR system may be coupled to the first vehicle to scan a complete 360° horizon of the first vehicle. The LiDAR system may be configured to provide to the computing device a cloud of point data representing the surface(s), which have been hit by the laser. The points may be represented by the LiDAR system in terms of azimuth and elevation angles, in addition to range, which can be converted to (X, Y, Z) point data relative to a local coordinate frame attached to the vehicle. Additionally, the LiDAR may be configured to provide intensity values of the light or laser reflected off the surfaces that may be indicative of a surface type. In examples, the LiDAR system may include components such as light (e.g., laser) source, scanner and optics, photo-detector and receiver electronics, and position and navigation system. In an example, The LiDAR system may be configured to use ultraviolet (UV), visible, or infrared light to image objects and can be used with a wide range of targets, including non-metallic objects. In one example, a narrow laser beam can be used to map physical features of an object with high resolution.

It should be noted that the LiDAR systems for collecting data pertaining to the surface may be included in systems other than the autonomous vehicle 901 such as, without limitation, other vehicles (autonomous or driven), robots, satellites, etc.

Figure 4:
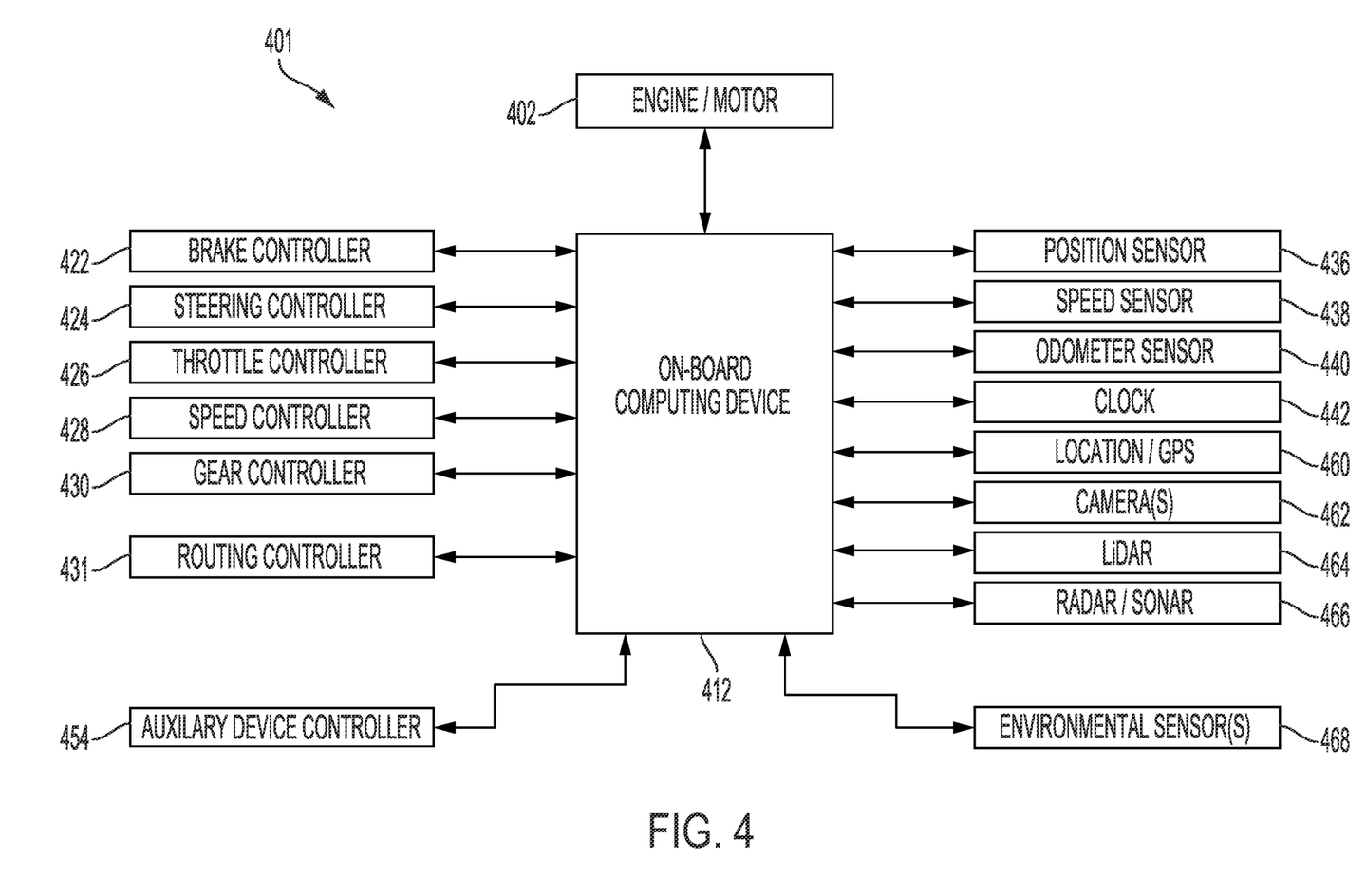
FIG. 4 illustrates an example vehicle controller system.

FIG. 4 illustrates an example system architecture for a vehicle 401, such as the autonomous vehicle 301 of FIG. 3 autonomous vehicle. The vehicle 401 may include an engine or motor 402 and various sensors for measuring various parameters of the vehicle and/or its environment. Operational parameter sensors that are common to both types of vehicles include, for example: a position sensor 436 such as an accelerometer, gyroscope and/or inertial measurement unit; a speed sensor 438; and an odometer sensor 440. The vehicle 401 also may have a clock 442 that the system architecture uses to determine vehicle time during operation. The clock 442 may be encoded into the vehicle on-board computing device 412, it may be a separate device, or multiple clocks may be available.

The vehicle 401 also may include various sensors that operate to gather information about the environment in which the vehicle is traveling. These sensors may include, for example: a location sensor 460 such as a GPS device; object detection sensors such as one or more cameras 462; a LiDAR sensor system 464; and/or a radar and or and/or a sonar system 466. The sensors also may include environmental sensors 468 such as a precipitation sensor and/or ambient temperature sensor. The object detection sensors may enable the vehicle 401 to detect objects that are within a given distance or range of the vehicle 401 in any direction, while the environmental sensors collect data about environmental conditions within the vehicle's area of travel. The system architecture will also include one or more cameras 462 for capturing images of the environment.

During operations, information is communicated from the sensors to an on-board computing device 412. The on-board computing device 412 analyzes the data captured by the sensors and optionally controls operations of the vehicle based on results of the analysis. For example, the on-board computing device 412 may control braking via a brake controller 422; direction via a steering controller 424; speed and acceleration via a throttle controller 426 (in a gas-powered vehicle) or a motor speed controller 428 (such as a current level controller in an electric vehicle); a differential gear controller 430 (in vehicles with transmissions); and/or other controllers such as an auxiliary device controller 454.

Geographic location information may be communicated from the location sensor 460 to the on-board computing device 412, which may then access a map of the environment that corresponds to the location information to determine known fixed features of the environment such as streets, buildings, stop signs and/or stop/go signals. Captured images from the cameras 462 and/or object detection information captured from sensors such as a LiDAR system 464 is communicated from those sensors to the on-board computing device 412. The object detection information and/or captured images may be processed by the on-board computing device 412 to detect objects in proximity to the vehicle 401. In addition or alternatively, the vehicle 401 may transmit any of the data to a remote server system 303 (FIG. 3) for processing. Any known or to be known technique for making an object detection based on sensor data and/or captured images can be used in the embodiments disclosed in this document.

The on-board computing device 412 may obtain, retrieve, and/or create map data that provides detailed information about the surrounding environment of the autonomous vehicle 401. The on-board computing device 412 may also determine the location, orientation, pose, etc. of the AV in the environment (localization) based on, for example, three dimensional position data (e.g., data from a GPS), three dimensional orientation data, predicted locations, or the like. For example, the on-board computing device 412 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 412 in analyzing the surrounding environment of the autonomous vehicle 401.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observation of vehicles or other objects over a period of time (e.g., reference paths for straight line travel, lane merge, a turn, or the like).

In certain embodiments, the on-board computing device 412 may also include and/or may receive information relating to the trip or route of a user, real-time traffic information on the route, or the like.

The on-board computing device 412 may include and/or may be in communication with a routing controller 431 that generates a navigation route from a start position to a destination position for an autonomous vehicle. The routing controller 431 may access a map data store to identify possible routes and road segments that a vehicle can travel on to get from the start position to the destination position. The routing controller 431 may score the possible routes and identify a preferred route to reach the destination. For example, the routing controller 431 may generate a navigation route that minimizes Euclidean distance traveled or other cost function during the route, and may further access the traffic information and/or estimates that can affect an amount of time it will take to travel on a particular route. Depending on implementation, the routing controller 431 may generate one or more routes using various routing methods, such as Dijkstra's algorithm, Bellman-Ford algorithm, or other algorithms. The routing controller 431 may also use the traffic information to generate a navigation route that reflects expected conditions of the route (e.g., current day of the week or current time of day, etc.), such that a route generated for travel during rush-hour may differ from a route generated for travel late at night. The routing controller 431 may also generate more than one navigation route to a destination and send more than one of these navigation routes to a user for selection by the user from among various possible routes.

In various embodiments, an on-board computing device 412 may determine perception information of the surrounding environment of the autonomous vehicle 401. Based on the sensor data provided by one or more sensors and location information that is obtained, the on-board computing device 412 may determine perception information of the surrounding environment of the autonomous vehicle 401. The perception information may represent what an ordinary driver would perceive in the surrounding environment of a vehicle. The perception data may include information relating to one or more objects in the environment of the autonomous vehicle 401. For example, the on-board computing device 412 may process sensor data (e.g., LiDAR or RADAR data, camera images, etc.) in order to identify objects and/or features in the environment of autonomous vehicle 401. The objects may include traffic signals, road way boundaries, other vehicles, pedestrians, and/or obstacles, etc. The on-board computing device 412 may use any now or hereafter known object recognition algorithms, video tracking algorithms, and computer vision algorithms (e.g., track objects frame-to-frame iteratively over a number of time periods) to determine the perception.

In some embodiments, the on-board computing device 412 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 412 may perform one or more prediction and/or forecasting operations. For example, the on-board computing device 412 may predict future locations, trajectories, and/or actions of one or more objects. For example, the on-board computing device 412 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 401, the surrounding environment, and/or their relationship(s). For example, if an object is a vehicle and the current driving environment includes an intersection, the on-board computing device 412 may predict whether the object will likely move straight forward or make a turn. If the perception data indicates that the intersection has no traffic light, the on-board computing device 412 may also predict whether the vehicle may have to fully stop prior to enter the intersection.

In various embodiments, the on-board computing device 412 may determine a motion plan for the autonomous vehicle. For example, the on-board computing device 412 may determine a motion plan for the autonomous vehicle based on the perception data and/or the prediction data. Specifically, given predictions about the future locations of proximate objects and other perception data, the on-board computing device 412 can determine a motion plan for the autonomous vehicle 401 that best navigates the autonomous vehicle relative to the objects at their future locations.

In one or more embodiments, the on-board computing device 412 may receive predictions and make a decision regarding how to handle objects and/or actors in the environment of the autonomous vehicle 401. For example, for a particular actor (e.g., a vehicle with a given speed, direction, turning angle, etc.), the on-board computing device 412 decides whether to overtake, yield, stop, and/or pass based on, for example, traffic conditions, map data, state of the autonomous vehicle, etc. Furthermore, the on-board computing device 412 also plans a path for the autonomous vehicle 401 to travel on a given route, as well as driving parameters (e.g., distance, speed, and/or turning angle). That is, for a given object, the on-board computing device 412 decides what to do with the object and determines how to do it. For example, for a given object, the on-board computing device 412 may decide to pass the object and may determine whether to pass on the left side or right side of the object (including motion parameters such as speed). The on-board computing device 412 may also assess the risk of a collision between a detected object and the autonomous vehicle 401. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 412 may execute one or more control instructions to perform a cautious maneuver (e.g., mildly slow down, accelerate, change lane, or swerve). In contrast, if the collision cannot be avoided, then the on-board computing device 412 may execute one or more control instructions for execution of an emergency maneuver (e.g., brake and/or change direction of travel).

As discussed above, planning and control data regarding the movement of the autonomous vehicle is generated for execution. The on-board computing device 412 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 3, the communications interface 314 may be configured to allow communication between autonomous vehicle 301 and external systems, such as, for example, external devices, sensors, other vehicles, servers, data stores, databases etc. Communications interface 314 may utilize any now or hereafter known protocols, protection schemes, encodings, formats, packaging, etc. such as, without limitation, Wi-Fi, an infrared link, Bluetooth, etc. User interface system 315 may be part of peripheral devices implemented within vehicle 301 including, for example, a keyword, a touch screen display device, a microphone, and a speaker, etc.

Figure 5:
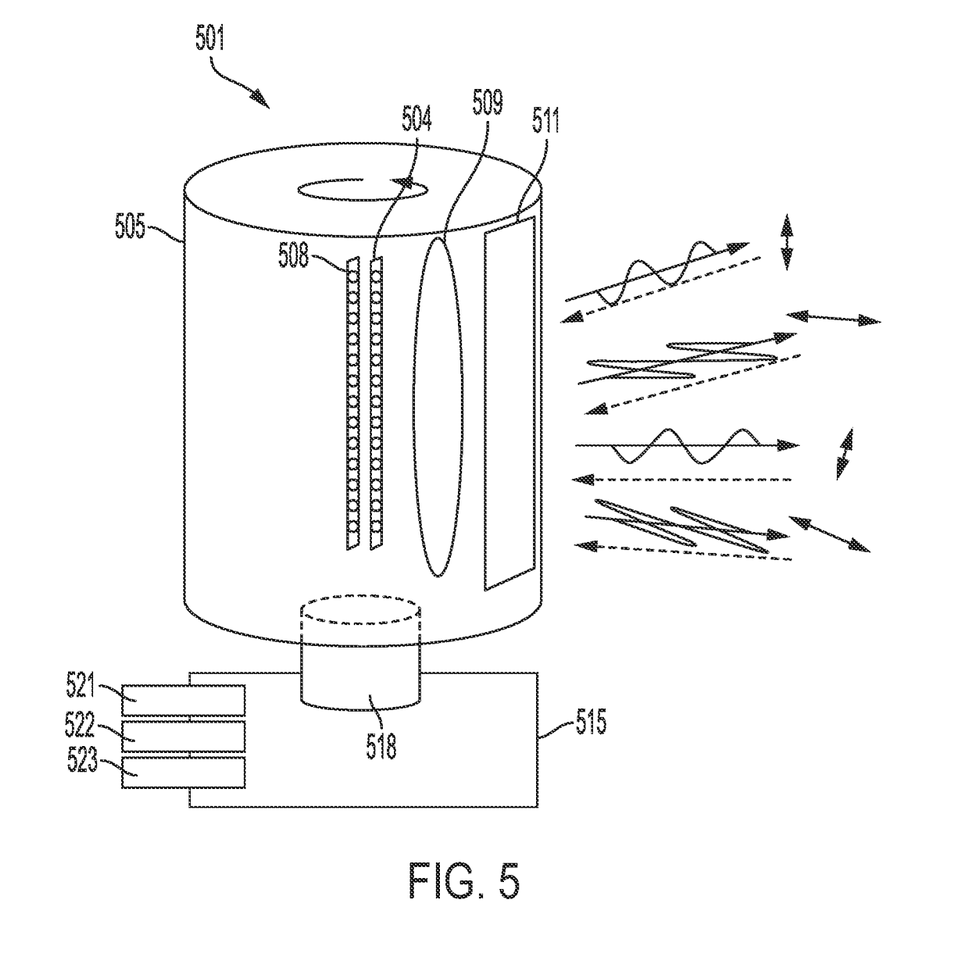
FIG. 5 shows an example LiDAR system.

FIG. 5 shows an example LiDAR system 501 as may be used in various embodiments. As shown in FIG. 5, the LiDAR system 501 includes a housing 505 which may be rotatable 360° about a central axis such as hub or axle 518. The housing may include an emitter/receiver aperture 511 made of a material transparent to light. Although the example shown in FIG. 5 has a single aperture, in various embodiments, multiple apertures for emitting and/or receiving light may be provided. Either way, the system can emit light through one or more of the aperture(s) 511 and receive reflected light back toward one or more of the aperture(s) 511 as the housing 505 rotates around the internal components. In an alternative embodiment, the outer shell of housing 505 may be a stationary dome, at least partially made of a material that is transparent to light, with rotatable components inside of the housing 505.

Inside the rotating shell or stationary dome is a light emitter system 504 that is configured and positioned to generate and emit pulses of light through the aperture 511 or through the transparent dome of the housing 505 via one or more laser emitter chips or other light emitting devices. The emitter system 504 may include any number of individual emitters, including for example 8 emitters, 64 emitters or 128 emitters. The emitters may emit light of substantially the same intensity, or of varying intensities. The individual beams emitted by 504 will have a well-defined state of polarization that is not the same across the entire array. As an example, some beams may have vertical polarization and other beams may have horizontal polarization. The LiDAR system will also include a light detector 508 containing a photodetector or array of photodetectors positioned and configured to receive light reflected back into the system. The emitter system 504 and detector 508 would rotate with the rotating shell, or they would rotate inside the stationary dome of the housing 505. One or more optical element structures 509 may be positioned in front of the light emitting unit 504 and/or the detector 508 to serve as one or more lenses or waveplates that focus and direct light that is passed through the optical element structure 509.

One or more optical element structures 509 may be positioned in front of the mirror 502 to focus and direct light that is passed through the optical element structure 509. As shown below, the system includes an optical element structure 509 positioned in front of the mirror 503 and connected to the rotating elements of the system so that the optical element structure 509 rotates with the mirror 502. Alternatively or in addition, the optical element structure 509 may include multiple such structures (for example lenses and/or waveplates). Optionally, multiple optical element structures 509 may be arranged in an array on or integral with the shell portion 511.

Optionally, each optical element structure 509 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

The LiDAR system will include a power unit 521 to power the laser emitter unit 504, a motor 503, and electronic components. The LiDAR system will also include an analyzer 515 with elements such as a processor 522 and non-transitory computer-readable memory 523 containing programming instructions that are configured to enable the system to receive data collected by the light detector unit, analyze it to measure characteristics of the light received, and generate information that a connected system can use to make decisions about operating in an environment from which the data was collected. Optionally, the analyzer 515 may be integral with the LiDAR system 501 as shown, or some or all of it may be external to the LiDAR system and communicatively connected to the LiDAR system via a wired or wireless communication network or link.

Figure 6:
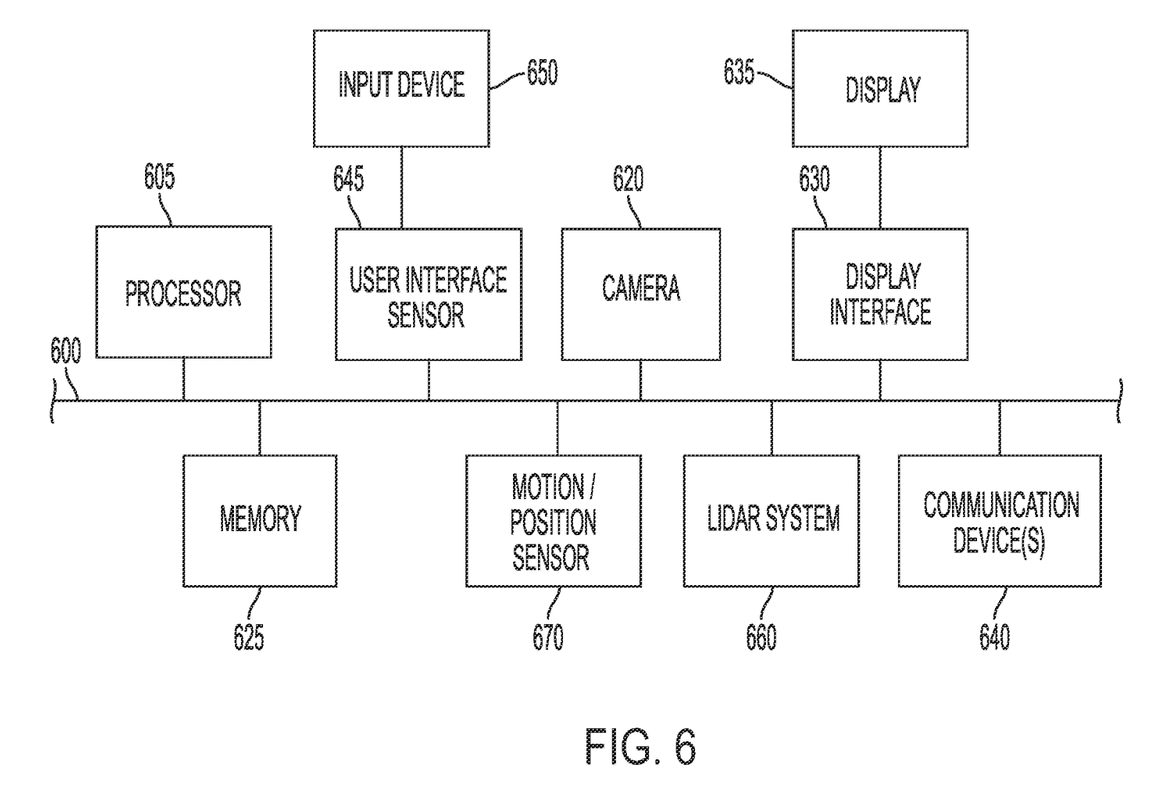
FIG. 6 is a block diagram that illustrates various elements of a possible electronic system, subsystem, controller and/or other component of an AV, and/or external electronic device.

FIG. 6 depicts an example of internal hardware that may be included in any of the electronic components of the system, such as internal processing systems of the AV, external monitoring and reporting systems, or remote servers. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 625. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 630 may permit information from the bus 600 to be displayed on a display device 635 in visual, graphic or alphanumeric format, such on an in-dashboard display system of the vehicle. An audio interface and audio output (such as a speaker) also may be provided. Communication with external devices may occur using various communication devices 640 such as a wireless antenna, a radio frequency identification (RFID) tag and/or short-range or near-field communication transceiver, each of which may optionally communicatively connect with other components of the device via one or more communication system. The communication device(s) 640 may be configured to be communicatively connected to a communications network, such as the Internet, a local area network or a cellular telephone data network.

The hardware may also include a user interface sensor 645 that allows for receipt of data from input devices 650 such as a keyboard or keypad, a joystick, a touchscreen, a touch pad, a remote control, a pointing device and/or microphone. Digital image frames also may be received from a camera 620 that can capture video and/or still images. The system also may receive data from a motion and/or position sensor 670 such as an accelerometer, gyroscope or inertial measurement unit. The system also may receive data from a LiDAR system 660 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include without, limitation, operating wheels or propellers to effectuate driving, flying or other transportation actions, operating robotic lifts for loading, unloading, medical-related processes, construction-related processes, and/or the like. Example automated devices may include, without limitation, autonomous vehicles, drones and other autonomous robotic devices.

An "inference message" refers to a message that includes information about the current state of an autonomous vehicle or a current state of one or more objects or actors in an environment of the autonomous vehicle.

A "forecast message" refers to a message that includes one or more forecasts or predictions pertaining to an autonomous vehicle or its environment.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The term "object", when referring to an object that is detected by a vehicle perception system or simulated by a simulation system, is intended to encompass both stationary objects and moving (or potentially moving) actors, except where specifically stated otherwise by terms use of the term "actor" or "stationary object."

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LIDAR system data, and/or other data.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A system, comprising:
    an on-board electronic device of an autonomous vehicle; and
    a computer-readable medium comprising one or more programming instructions that, when executed, cause the on-board electronic device to:
        receive one or more forecast messages pertaining to a track, wherein each of the forecast messages comprise a unique identifier associated with the track,
        receive one or more inference messages pertaining to the track, wherein each of the inference messages comprise the unique identifier,
        aggregate the one or more forecast messages and the one or more inference messages to generate a message set,
        apply a set of processing operations to the message set to generate a feedback message, wherein the feedback message comprises an indication of one or more forecast errors between one or more of the forecast messages and one or more of the inference messages,
        identify one or more events from the feedback message,
        for one or more of the events that is identified, automatically generate an annotation for the event,
        embed the generated annotations in an event log for the autonomous vehicle
        apply a set of processing operations that are specific to the unique identifier to the message set to generate a feedback message comprise one or more programming instructions, that when executed, cause the on-board electronic device to:
            access a mapping from a data store, and
            identify the set of processing operations that are associated with the unique identifier from the mapping.

2. The system of claim 1, wherein the one or more programming instructions, that when executed, cause the on-board electronic device to receive one or more forecast messages pertaining to a track comprise one or more programming instructions, that when executed, cause the on-board electronic device to monitor a forecast channel that is broadcasting the one or more forecast messages.

3. The system of claim 1, wherein the one or more programming instructions, that when executed, cause the on-board electronic device to receive one or more inference messages pertaining to a track comprise one or more programming instructions, that when executed, cause the on-board electronic devices to monitor an inference channel that is broadcasting the one or more inference messages.

4. The system of claim 1, wherein the one or more forecast messages comprise one or more forecasts of a future state of the autonomous vehicle or one or more forecasts of a future state of one or more objects or actors in proximity to the autonomous vehicle.

5. The system of claim 1, wherein the one or more inference messages comprise information pertaining to a current state of the autonomous vehicle or a current state of one or more objects or actors in proximity to the autonomous vehicle.

6. The system of claim 1, wherein the one or more programming instructions, that when executed, cause the on-board electronic device to identify one or more events from the feedback message comprise one or more programming instructions, that when executed, cause the on board electronic device to apply a second set of processing operations to the feedback message, wherein the second set of processing operations is associated with a particular event type.

7. The system of claim 1, wherein the one or more programming instructions, that when executed, cause the on-board electronic device to automatically generate an annotation for the event comprise one or more programming instructions, that when executed, cause the on-board electronic device to automatically generate a human-readable string comprising one or more alphanumeric characters.

8. The system of claim 1, wherein the computer-readable medium further comprises one or more programming instructions that, when executed, cause the on-board electronic device to train one or more classifiers of one or more machine learning models for the autonomous vehicle using the annotations in the event log.

9. A method, comprising:
    by an on-board electronic device of an autonomous vehicle:
        receiving one or more forecast messages pertaining to a track, wherein each of the forecast messages comprise a unique identifier associated with the track,
        receiving one or more inference messages pertaining to the track, wherein each of the inference messages comprise the unique identifier,
        aggregating the one or more forecast messages and the one or more inference messages to generate a message set,
        applying a set of processing operations to the message set to generate a feedback message, wherein the feedback message comprises an indication of one or more forecast errors between one or more of the forecast messages and one or more of the inference messages, identifying one or more events from the feedback message by applying a second set of processing operations to the feedback message, wherein the second set of processing operations is associated with a particular event type, for one or more of the events that is identified, automatically generating an annotation for the event, and embedding the generated annotations in an event log for the autonomous vehicle.

10. The method of claim 9, wherein receiving one or more forecast messages pertaining to a track comprises monitoring a forecast channel that is broadcasting the one or more forecast messages.

11. The method of claim 9, wherein receiving one or more inference messages pertaining to a track comprises monitoring an inference channel that is broadcasting the one or more inference messages.

12. The method of claim 9, wherein the one or more forecast messages comprise one or more forecasts of a future state of the autonomous vehicle or one or more forecasts of a future state of one or more objects or actors in proximity to the autonomous vehicle.

13. The method of claim 9, wherein the one or more inference messages comprise information pertaining to a current state of the autonomous vehicle or a current state of one or more objects or actors in proximity to the autonomous vehicle.

14. The method of claim 9, wherein applying a set of processing operations to the message set to generate a feedback message comprises:

accessing a mapping from a data store; and identifying the set of processing operations that are associated with the unique identifier from the mapping.

15. The method of claim 9, wherein automatically generating an annotation for the event comprises automatically generating a human-readable string comprising or more alphanumeric characters.

16. The method of claim 9, further comprising training one or more classifiers of one or more machine learning models for the autonomous vehicle using the annotations in the event log.

* * * * *